(12) United States Patent
Nissen et al.

(10) Patent No.: US 6,470,992 B2
(45) Date of Patent: Oct. 29, 2002

(54) AUXILIARY SOLENOID CONTROLLED VARIABLE DISPLACEMENT POWER STEERING PUMP

(75) Inventors: Steven Thomas Nissen, Farmington Hills, MI (US); Brian Stanley Modrzejewski, Westland, MI (US); Shawn Patrick Cap'ser, Monroe, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/826,268

(22) Filed: Apr. 3, 2001

(65) Prior Publication Data

US 2002/0139604 A1 Oct. 3, 2002

(51) Int. Cl.[7] .............................. F03C 2/00; B62D 5/14
(52) U.S. Cl. ....................... 180/429; 180/441; 417/221; 418/27
(58) Field of Search ............................ 418/16, 27, 29; 417/218, 219, 220, 221; 180/417, 429, 441

(56) References Cited

U.S. PATENT DOCUMENTS

| | | | |
|---|---|---|---|
| 4,183,723 A | * | 1/1980 | Hansen et al. ............... 417/204 |
| 4,522,565 A | | 6/1985 | Stockton |
| 4,658,584 A | | 4/1987 | Suzuki et al. |
| 4,711,619 A | * | 12/1987 | Sundberg et al. ............. 418/27 |
| 5,028,214 A | | 7/1991 | Masuda |
| 5,072,650 A | * | 12/1991 | Phillips ..................... 91/375 A |
| 5,190,447 A | * | 3/1993 | Schneider ................... 417/356 |
| 5,192,196 A | | 3/1993 | Gettel |
| 5,316,450 A | * | 5/1994 | Kast ........................... 417/295 |
| 5,513,960 A | | 5/1996 | Uemoto |
| 5,518,380 A | * | 5/1996 | Fujii et al. ..................... 418/26 |
| 5,562,432 A | | 10/1996 | Semba et al. .................. 418/26 |
| 5,799,562 A | * | 9/1998 | Weinberg .................... 92/12.2 |
| 6,213,730 B1 | | 4/2001 | Yasuda et al. |
| 6,217,296 B1 | | 4/2001 | Miyazawa et al. |

OTHER PUBLICATIONS

Karmel, A.M., "A Study of the Internal Forces in a Variable–Displacement Vane–Pump—Part I: A Theoretical Analysis," *Journal of Fluids Engineering*, vol. 108, pp. 227–232 (1986).
Mochizuki, Teruhiko, "Development of the Variable Displacement Vane Pump for the Automotive Power Steering System," SAE Technical Paper Series, pp. 1–10, 930261.

* cited by examiner

Primary Examiner—Avraham Lerner
(74) Attorney, Agent, or Firm—Brinks Hofer Gilson & Lione

(57) ABSTRACT

An auxiliary solenoid controlled variable displacement power steering pump, hydraulic systems incorporating same, and method for improving the efficiency of variable displacement power steering pumps. In one embodiment, a rotor is arranged within a pump body, and a cam fitted on an outer periphery of the rotor and movably arranged within the pump body to form a variable volume pump chamber. The cam is biased towards a position within the pump body to create maximum displacement. A mechanism is provided for forcing the cam into a position of fixed minimum or reduced displacement under certain conditions, such as low engine speed and power steering demand. In a preferred embodiment, the mechanism comprises a solenoid driven connecting rod that is operatively connected to the cam. Activation of the solenoid forces the cam to a position of fixed minimum or reduced displacement.

13 Claims, 4 Drawing Sheets

AUXILIARY SOLENOID CONTROLLED VARIABLE DISPLACEMENT POWER STEERING PUMP

FIELD OF THE INVENTION

This invention relates generally to the field of pumps for use in hydraulic systems, such as power steering systems. In particular, this invention relates to a new design for a variable displacement power steering pump and system.

DESCRIPTION OF THE RELATED ART

Variable displacement (VD) power steering pumps utilize hydraulic pressure and pump shaft revolution speed to change the displacement of the pump, thus reducing the input torque requirements on the drive engine's front end accessory drive (FEAD). The ability of VD power steering pumps to change their displacement in response to pump shaft speed makes the pumps more fuel efficient as a result of reduced input torque requirements. These pumps are commonly used in power steering systems.

A TYPICAL POWER STEERING SYSTEM

With reference to FIG. 1, a typical power steering system is illustrated. The system comprises a steering gear 1, an oil pump 2, a reserve tank 3, hydraulic piping 4, a cooler 5, and, of course, a steering wheel 6. The steering gear 1 is actuated by input from the steering wheel. Oil pump 2 pumps oil through hydraulic piping 4 to the steering gear 1. Oil from the steering gear may be run through cooler 5 after use. Fixed displacement pumps generate excess flow at medium or high speeds, which raises the oil temperature. The heat lost in cooling the oil corresponds to lost power and efficiency. Variable displacement pumps raise the efficiency of power steering systems by reducing the loss of energy caused by surplus flow in fixed displacement pumps. This is accomplished by generating flow that better corresponds to system needs.

VARIABLE DISPLACEMENT POWER STEERING PUMP OPERATION

With reference to FIG. 2, a variable displacement (VD) power steering pump's internal rotating group is illustrated. The internal rotating group comprises a rotor 10, vanes 12, cam (or cam ring) 14, pivot pin 16, and outer ring 18, as well as two pressure plates and a wiper seal (not shown). The rotor 10 is connected to a rotating pump shaft 20. The rotor 10 and vanes 12 are surrounded by cam 14, which is coupled to a pivot pin 16 that permits the cam to move its center with respect to the pump shaft center. By altering the relative position of the cam center to the rotor center, the eccentricity of the cam to the pump shaft center can be altered, consequently altering the displacement of the pump. A spring 22 biases the cam towards a predetermined position of maximum eccentricity permitted by the device. For the purposes of this illustration, rotor 10 rotates in the clockwise direction shown by arrow 23.

The general function of such pumps is to hydraulically respond to the needs of the steering system, as well as to changes in engine revolutions per minute (rpm). The pump only provides the amount of flow that is required by the system by varying the displacement of the pump in response to shaft speed and system pressure. As shaft speed increases, the pump output flow increases. When the pump reaches a desired shaft speed, a spool valve and spring combination allows pressure to be exposed on one side of the cam. This pressure causes the cam to move or rotate about pivot pin 16 in the direction shown by arrow 24, decreasing the eccentricity of the cam with respect to the pump shaft center, and thereby decreasing the displacement of the pump. As the shaft speed increases, the pump displacement is decreased in order to provide a steady flow that is metered by an orifice, which is located in the pressure plate. An inlet flow path 26 and an outlet flow path 28 are each indicated by a corresponding numbered arrow in FIG. 2.

Generally, two pressure plates are used to contain the outer ring, cam, rotor, and vanes as a single group. The face details of both plates are mirror images of each other. Each plate serves several functions in the pump. For example, the plates create a seal for the rotating group and provide a path for pump fluid. One of the plates contains a metered orifice for the outlet flow. A pressure port serves as a fluid outlet as the chamber volume decreases in the rotating group. A suction port serves as a fluid inlet to the rotating group as the chamber volume increases. Referring to FIG. 2, the rotation of the shaft is clockwise. If the Figure is reversed, the rotation would be counterclockwise. The under vane ports provide hydraulic pressure behind the vanes to face the vane tips to ride along the cam profile, creating a sealed chamber between the vanes allowing the pump to do work on the fluid.

Further information on variable displacement pumps and power steering systems can be found in numerous patents, articles and books, such as but not limited to U.S. Pat. No. 5,562,432, entitled Variable Displacement Pump Having Throttled Control Passages; Karmel, A. M., "A study of the Internal Forces in a Variable Displacement Vane Pump, Part 1, Theoretical Analysis," Journal of Fluids Engineering, Vol. 108/227, June 1986; and Mochizuki, Teruhiko, "Development of the Variable Displacement Vane Pump for the Automotive Power Steering System," Report #SAE-930261, SAE, 1993, all of which are incorporated by reference as if reproduced in full herein.

Although the use of variable displacement pumps in place of fixed displacement pumps has increased the efficiency of hydraulic systems, it is desired to further increase the efficiency of variable displacement pumps and the hydraulic systems incorporating them. For example, during straight ahead driving, minimal displacement is necessary, yet often higher displacements are present. This higher pump displacement causes unnecessary input torque requirements on the engine's front end accessory drive (FEAD). It is desired to reduce such "parasitic" losses of power by better matching pump displacement to requirements.

BRIEF SUMMARY OF THE INVENTION

In one embodiment, the present invention provides a variable displacement pump having a fixed displacement mode and a variable displacement mode. The fixed displacement mode is made possible by a mechanical control that can adjust the eccentricity of the cam to provide a fixed displacement. The present invention also incorporates a hydraulic system, comprising a pump drive input, an output driven mechanism, and a variable displacement pump having a fixed displacement mode and a variable displacement mode. In a preferred embodiment, the mechanical control comprises a solenoid-operated connecting rod that directly varies the eccentricity of the cam with respect to the pump shaft center. The connecting rod is operatively connected to the cam to cause the cam to pivot in response to the relative linear motion of the rod. Preferably, in use, the solenoid is selectively activated in response to pump shaft speed and hydraulic pressure, so that, in a power steering system for example, when there is low power steering demand and engine speed is below a predetermined level, the cam is situated for minimum pump displacement.

When a pump constructed in accordance with the present invention is utilized in a vehicle power steering system, the pump will be in fixed displacement mode at low to moderate speeds with no steering input, and will switch to variable displacement mode with steering input or at higher speeds.

The present invention also incorporates a method for improving the efficiency of variable displacement pumps and systems using them by providing a fixed reduced displacement mode. In an embodiment, the method comprises forcing the cam of a variable displacement pump to a position that reduces displacement in response to reduced requirements from the output driven mechanism, e.g., power steering gear, or low or moderate pump shaft speed.

It is to be understood that both the preceding summary and the detailed description that follows are intended merely to be exemplary and to explain further the invention claimed. The invention may be better understood by reference to the following detailed description read in conjunction with the accompanying drawings.

DETAILED DESCRIPTION OF THE INVENTION

Figure 1:
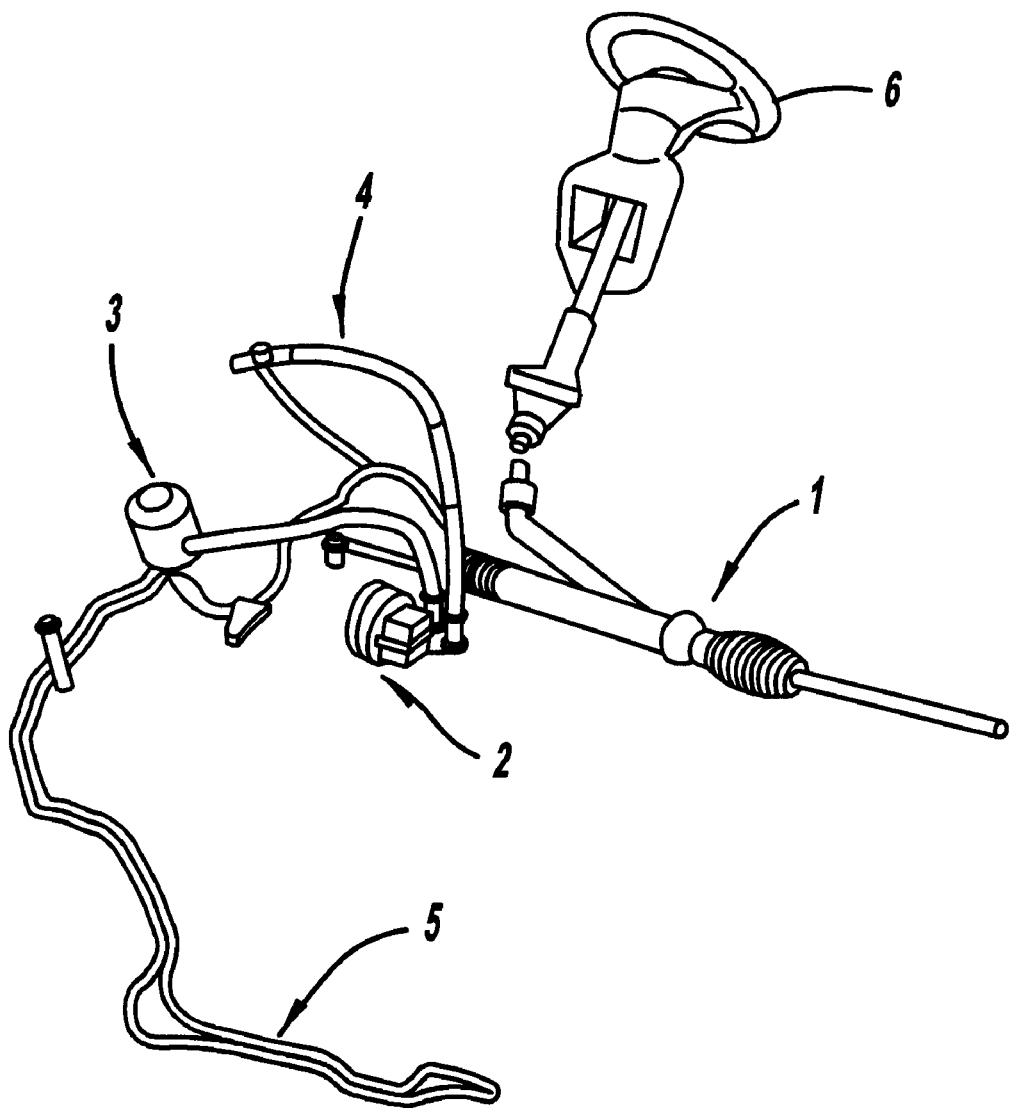
FIG. 1 is an illustration of a typical power steering system.
Figure 2:
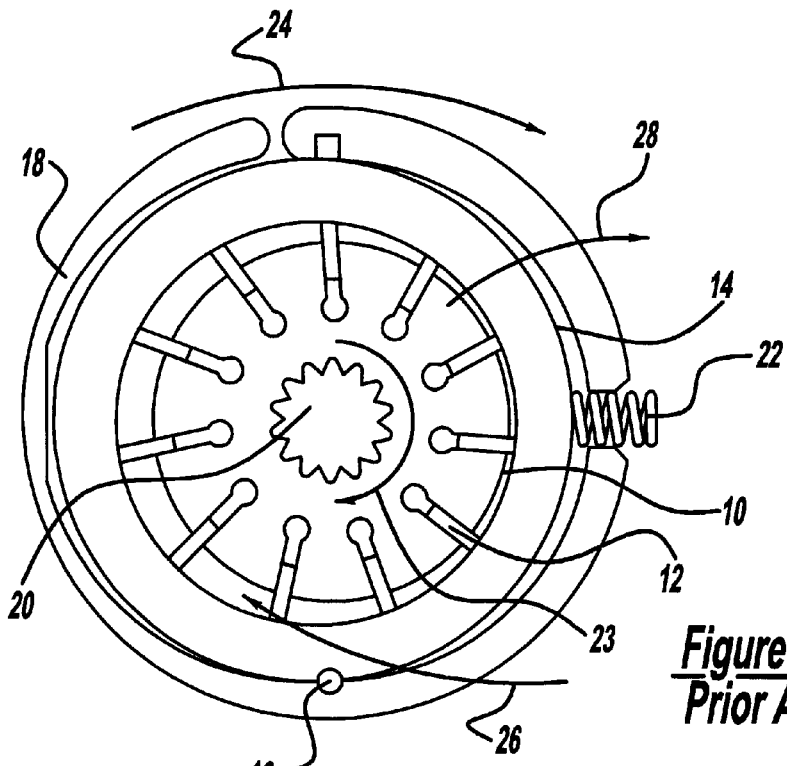
FIG. 2 shows a prior art internal rotating group assembly for a variable displacement pump.
Figure 3:
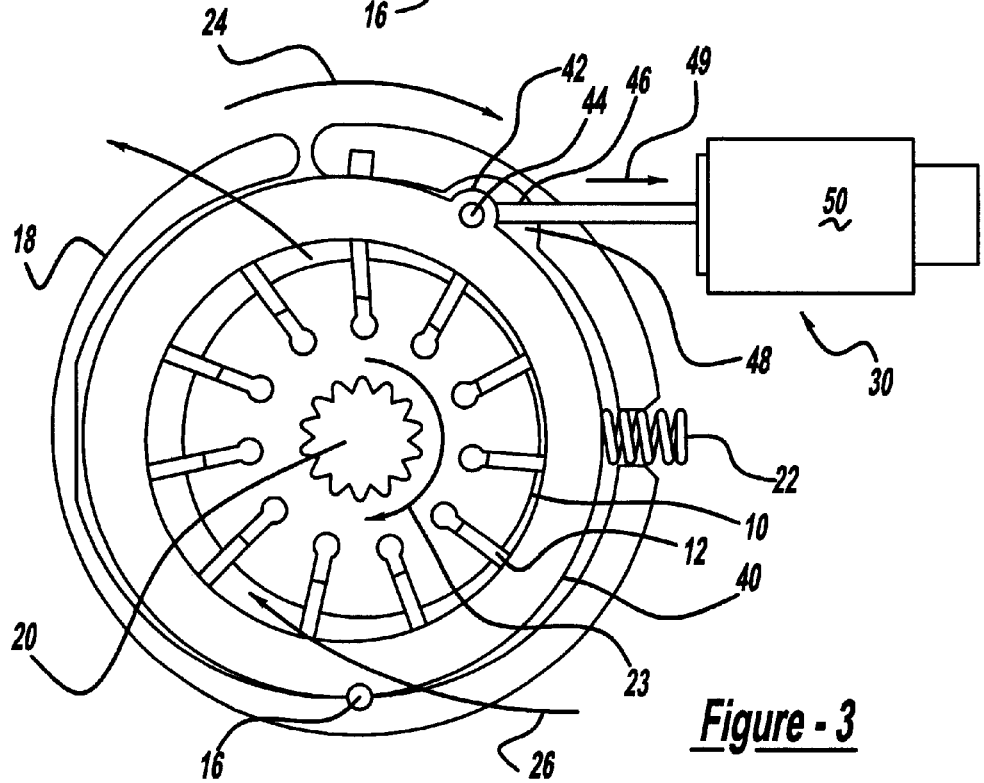
FIG. 3 illustrates an embodiment of the present invention in which the internal rotating group assembly for a variable displacement pump is operatively connected to a solenoid controlled connecting rod that can vary the eccentricity of the cam with respect to the pump shaft center.

An embodiment of the present invention may be better understood with reference to FIG. 3. A variable displacement pump internal rotating group assembly is operatively connected to a mechanism 30 that can forcibly decrease the eccentricity of a cam 40 with respect to the pump shaft center. The internal rotating group of FIG. 3 is essentially the same as that shown in FIG. 2, except for the following changes. The outer perimeter of cam 40 is different from cam 14 in FIG. 2 in that it includes a flange 42 with a rotating pin 44. Pin 44 operatively connects cam 40 to connecting rod 46. Further, the inner perimeter of the outer ring has been modified to include a matching depression 48 to allow a range of reciprocating motion for flange 42. In a preferred embodiment, rod 46 is linearly actuated in the direction of arrow 49 when solenoid 50 is activated. The bias of spring 22 is counteracted by solenoid 50 when the solenoid is activated. Thus, when the solenoid is activated, the pump is in fixed displacement mode, otherwise the pump is in variable displacement mode. In an embodiment, the activated solenoid causes a fixed displacement, and when the solenoid is not activated it will have essentially no impact on the pump displacement. However, it is envisioned that the solenoid may be modified to provide a range of fixed displacements when activated.

In a preferred embodiment, a variable displacement pump with fixed displacement mode is incorporated into a hydraulic system. The hydraulic system comprises a pump drive input, an output driven mechanism, and the pump. The pump drive input provides power to turn the pump shaft, and can be any motor or engine of sufficient power, such as but not limited to an internal combustion gas or diesel engine. The output driven mechanism can be any device that can be driven by the pump output, such as but not limited to a crane, bulldozer blade, backhoe bucket, or agricultural harvesting tool.

In an embodiment, an automotive power steering system is provided that utilizes a variable displacement pump with fixed displacement mode, with the pump incorporating structure such as that illustrated in FIG. 3. The solenoid can be activated in response to system pressure and engine speed. Preferably, the solenoid is activated when there is no steering input and at predetermined low to mid engine speeds.

There are various methods to control the solenoid, including but not limited to using a microprocessor that utilizes one or more of the following input parameters: system pressure, engine speed, steering wheel angle, pump flow, and pump speed. The input parameters can be measured in various ways, including but not limited to sensors, transducers, flow meters, and gauges. In the alternative, transducers can be directly operatively connected to the solenoid that will activate the solenoid in response to predetermined system pressures and engine speeds.

An advantage to this invention is that in straight ahead driving at low to moderate speeds and during acceleration therefrom, there is less pump displacement, and hence less input torque requirements from the engine's front end accessory drive (FEAD), reducing parasitic loss on the FEAD due to the pump. The increased efficiency resulting from the devices constructed and used in accordance with the present invention is graphically illustrated in FIGS. 4 and 5.

Figure 4:
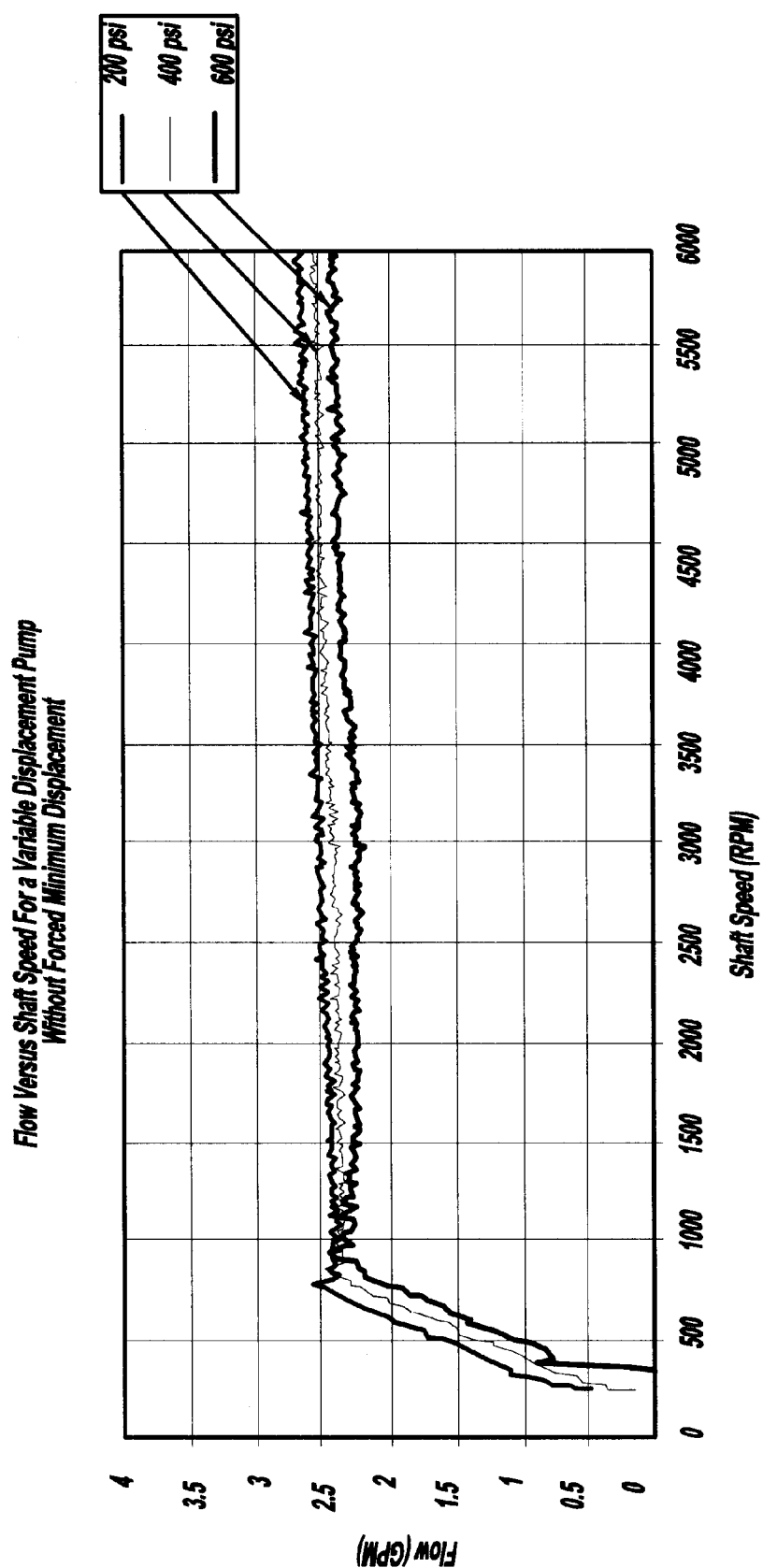
FIG. 4 is a graphical depiction of the relationship between pump flow versus shaft speed (in rpm) at various pressures without forced displacement adjustment.

With reference to FIG. 4, pump shaft speed (in rpm) is related to pump flow (in GPM) for a Visteon "VDP" variable displacement pump, such as that utilizing the rotating group illustrated in FIG. 2. Regardless of system pressure, increase of shaft speed from approximately 400 rpm to about 800 rpm led to an increase in flow of from less than about 0.5 GPM to about 2.5 GPM. Further increases in shaft speed had little impact on flow, as at higher rpm, the cam is pivoted to a position that results in lower displacement. Note that a minimum flow in steering gear is required to obtain power assist. Generally, steering input changes back pressure, and causes the cam to shift for higher displacement to get higher flow.

Figure 5:
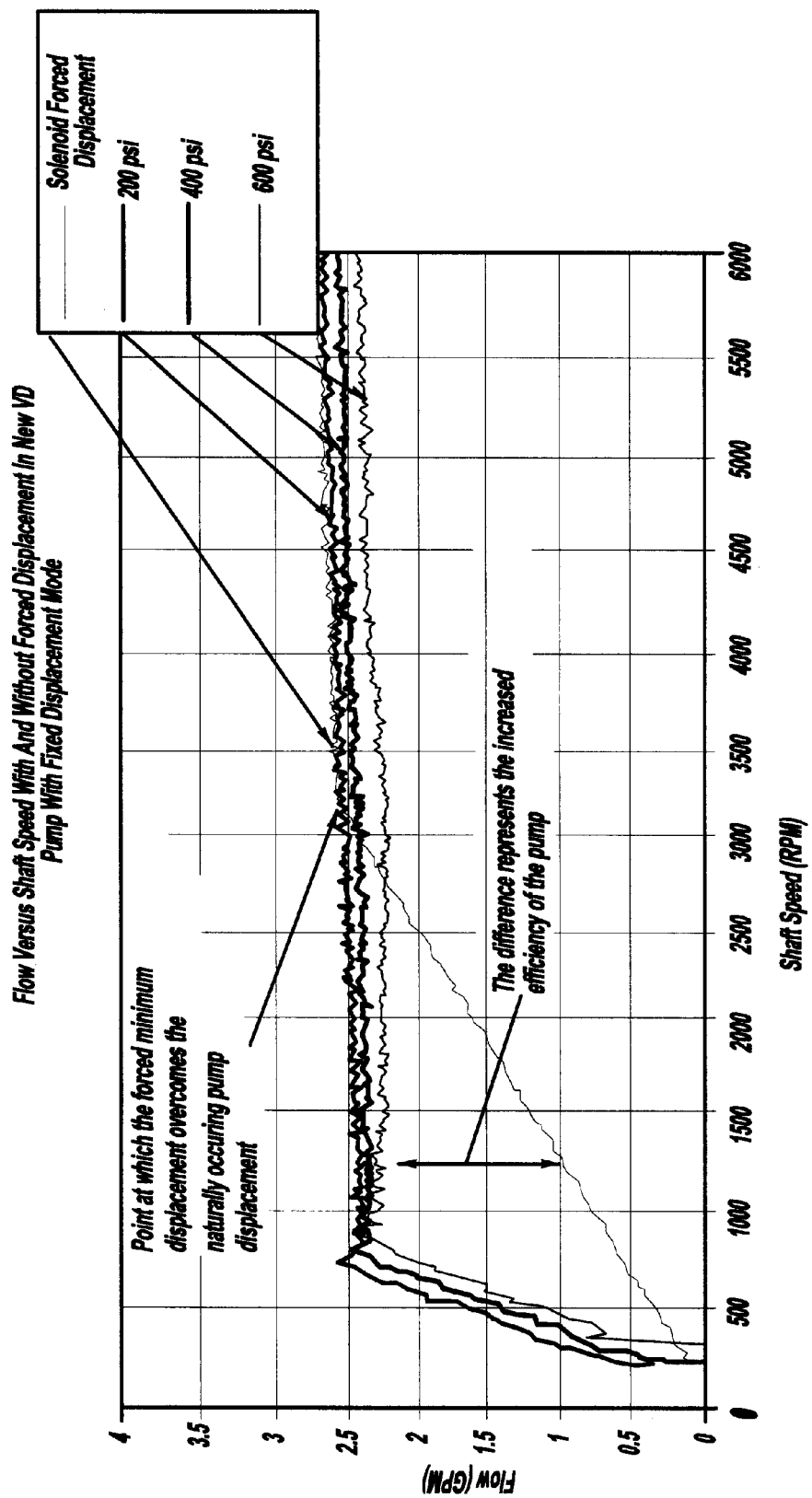
FIG. 5 is a graphical depiction of the relationship between pump flow versus shaft speed (in rpm) at varying pressures with forced displacement adjustment.

With reference to FIG. 5, pump shaft speed is related to pump flow for a Visteon "VDP" variable displacement pump constructed in accordance with the embodiment of the present invention illustrated in FIG. 3. The Figure demonstrates in graphical form the dramatic difference in flow at shaft speeds ranging from about 400 rpm to about 3000 rpm at three different pressures when the cam is forced to a position of minimum displacement. When the shaft speed reaches a point where the "naturally" occurring displacement equals or approximates that obtained with forced displacement of the cam by the piston, the solenoid can be turned off or deactivated. Naturally occurring displacement refers to the displacement that results from operation of the variable displacement pump in variable displacement mode, wherein the displacement is reduced in response to higher pump shaft speed. Above a certain pump shaft speed, the displacement of the pump will be reduced below or approximate the displacement that would be caused by activation of the solenoid.

The solenoid can be deactivated at lower shaft speeds in response to steering maneuvers. The reduction in flow when the cam is forced into a minimum displacement position and when the cam adjustment mechanism of the present invention is not present or is not activated corresponds to the greatly increased efficiency of pumps and hydraulic systems constructed and utilized in accordance with the present invention.

In an embodiment of an automotive power steering system, the gear piston must always be charged. The minimum displacement required to maintain the piston charge is calculated as the minimum displacement to overcome the internal leakages in the pump and gear assemblies. For example, if the internal leakage in the pump and gear were 0.3 and 0.2 gallons per minute respectively, the minimum displacement would have to be 3.06 cc per rev. In other words, the cam cannot be forced into a position wherein the displacement of the pump is not sufficient to keep the gear piston charged.

The combined internal leakage value for a particular power steering system can be calculated, and either the solenoid programmed or adjusted to maintain the minimum displacement or a mechanical stop used to maintain the minimum displacement. This would prevent the pump from producing a flow lower then the combined internal leakage and consequently would keep the gear piston charged. A factor of safety could easily be added in the control mechanism. However, the solenoid controlled displacement cannot be held throughout the rpm range, as at higher rpm, the solenoid controlled minimum displacement becomes higher than the "naturally" occurring displacement in the pump, as shown in FIG. 5. At the point where the forced displacement becomes less than the "naturally" occurring displacement, the solenoid would be switched off, so that the solenoid controlled VD pump functions like a standard VD pump.

EXAMPLE 1

The improved efficiency of an auxiliary solenoid controlled variable displacement pump was tested using a computer simulation. The change in fuel economy for the solenoid controlled VD pump versus a standard VD pump was evaluated. The pumps were modeled in a 2000MY Ford Expedition with a 4.6 liter engine, and a 4×4 driveline. A CVSP model (Corporate Vehicle Simulation Program from Ford) was used that measures fuel economy for highway and city driving. The results are equivalent to the advertised sticker fuel economy placed on the vehicles before sale. Using the CVSP model, the solenoid pump saved an additional 0.01 mile per gallon (mpg) in a metro-highway scenario.

The improved pumps of the present invention are useful in all modes of self-propelled vehicles, such as but not limited cars, buses, and trucks, and may also be useful in other applications.

While a new auxiliary solenoid controlled variable displacement power steering pump has been disclosed as an example, there could be a wide range of changes made to this pump and hydraulic systems incorporating same without departing from the present invention. Thus, it is intended that the foregoing detailed description be regarded as illustrative rather than limiting and that it be understood that it is the following claims, including all equivalents, which are intended to define the scope of the invention.

What is claimed is:

1. A variable displacement pump having a fixed displacement mode, comprising:

a rotor having vanes, a pump body, and a cam, said rotor being rotatably arranged within said pump body, said cam fitted on an outer periphery of said rotor and movably arranged within said pump body to form a variable displacement pump chamber, said cam being biased in a direction to increase the pump chamber displacement, and a mechanism for selectively adjusting the position of said cam counter to the direction in which said cam is biased within said pump body to selectively provide a fixed displacement for said pump.

2. The pump of claim 1, wherein when said pump is operatively connected to an engine and power steering system, said mechanism is capable of being activated or deactivated in response to steering system requirements and operating parameters of the engine.

3. The pump of claim 1, wherein said mechanism comprises a connecting rod operatively connected to said cam, wherein actuation of said connecting rod adjusts the position of said cam.

4. The pump of claim 3, wherein said connecting rod is controlled by a solenoid.

5. The pump of claim 4, wherein, when said pump is operatively connected to an engine and into a power steering system, said solenoid can be activated or deactivated in response to engine speed and power steering system requirements.

6. The pump of claim 4, further comprising a microprocessor control, wherein said solenoid is controlled by said microprocessor.

7. A hydraulic system, comprising an output driven mechanism, and a variable displacement pump having a fixed displacement mode and a variable displacement mode, said pump comprising a rotor having vanes, a pump body, and a cam, said rotor being rotatably arranged within said pump body, said cam fitted on an outer periphery of said rotor and movably arranged within said pump body to form a variable displacement pump chamber, said cam being biased in a direction to increase said pump chamber displacement, and a mechanism for selectively adjusting the position of said cam counter to the direction in which said ring is biased within said pump body in order to selectively provide a fixed displacement for said pump.

8. The system of claim 7, wherein said mechanism for selectively adjusting the position of said cam comprises a connecting rod operatively connected to said cam, wherein actuation of said connecting rod adjusts the position of said cam.

9. The system of claim 8, wherein said connecting rod is controlled by a solenoid.

10. The system of claim 9, wherein said output driven mechanism is a power steering device.

11. The system of claim 9, further comprising a microprocessor, wherein said solenoid is controlled by said microprocessor.

12. The system of claim 11, wherein said system further comprises a pump drive input.

13. The system of claim 12, wherein said pump drive input is an internal combustion engine operatively connected to said rotor, said output driven mechanism is a power steering device, and said microprocessor has inputs for at least one of the group consisting of fluid pressure, engine speed, steering wheel angle, pump flow, and pump speed.

* * * * *